United States Patent
Egusa et al.

(10) Patent No.: US 7,221,897 B2
(45) Date of Patent: May 22, 2007

(54) PLASTIC SHEET MANUFACTURING METHOD AND PLASTIC SHEET MANUFACTURING APPARATUS

(75) Inventors: Naoyuki Egusa, Ashigarakami-gun (JP); Tetsuro Kodera, Ashigarakami-gun (JP)

(73) Assignee: Fuji Xerox Co. Ltd., Tokyo (JP)

( * ) Notice: Subject to any disclaimer, the term of this patent is extended or adjusted under 35 U.S.C. 154(b) by 173 days.

(21) Appl. No.: 10/937,333

(22) Filed: Sep. 10, 2004

(65) Prior Publication Data
US 2005/0175381 A1    Aug. 11, 2005

(30) Foreign Application Priority Data
Feb. 10, 2004   (JP)   ............... 2004-033741

(51) Int. Cl.
*G03G 15/20*   (2006.01)
(52) U.S. Cl. .................................... 399/329
(58) Field of Classification Search ............... 399/342, 399/329
See application file for complete search history.

(56) References Cited

U.S. PATENT DOCUMENTS

| | | | |
|---|---|---|---|
| 4,242,566 A * | 12/1980 | Scribner | ............ 399/329 |
| 5,342,715 A * | 8/1994 | Kamath et al. | |
| 5,637,174 A * | 6/1997 | Field et al. | |
| 5,927,189 A * | 7/1999 | Jones et al. | ............ 399/329 |
| 5,974,282 A * | 10/1999 | Yamada | |
| 6,029,041 A * | 2/2000 | Takano et al. | ............ 399/394 |
| 6,134,399 A * | 10/2000 | Hino et al. | |
| 6,296,032 B1 * | 10/2001 | Louie et al. | |
| 6,370,352 B1 * | 4/2002 | Tomita | ............ 399/329 |
| 6,907,221 B2 * | 6/2005 | Tanino et al. | ............ 399/329 |
| 2004/0136750 A1 * | 7/2004 | Yoshioka et al. | ............ 399/329 |

FOREIGN PATENT DOCUMENTS

| | | | |
|---|---|---|---|
| JP | 62041134 A | * | 2/1987 |
| JP | A 2-25331 | | 1/1990 |
| JP | 08194393 A | * | 7/1996 |
| JP | 09138601 A | * | 5/1997 |
| JP | 11161040 A | * | 6/1999 |
| JP | A 11-334265 | | 12/1999 |
| JP | A 2001-092255 | | 4/2001 |

* cited by examiner

*Primary Examiner*—Susan Lee
(74) *Attorney, Agent, or Firm*—Oliff and Berridge, PLC (57) ABSTRACT

A method for plastic sheet manufacturing whereby a layered body including a film is made to pass through a nip portion formed by a pair of belts, each having a joint portion, causing the layered body to be integrated to manufacture a plastic sheet. Before integration, the position of each of the joint portions is detected and the timing at which the layered body enters the nip portion is controlled in accordance with the detected positions. A plastic sheet manufacturing apparatus implements the plastic sheet manufacturing method.

12 Claims, 8 Drawing Sheets

PLASTIC SHEET MANUFACTURING METHOD AND PLASTIC SHEET MANUFACTURING APPARATUS

CROSS-REFERENCE TO RELATED APPLICATION

This application claims priority under 35 USC 119 from Japanese Patent Application No. 2004-33741, the disclosure of which is incorporated by reference herein.

BACKGROUND OF THE INVENTION

1. Field of the Invention

The present invention relates to a plastic sheet manufacturing method, and to a plastic sheet manufacturing apparatus that laminates films which transmit light, and in which an image is directly formed (recorded) by an electrophotographic image forming device. More specifically, the invention relates to a manufacturing method, and to a manufacturing apparatus of plastic sheets used as information media containing personal information and/or image information which is read out by either a non-contact or contact reading method. Examples of applications are documents containing a facial portrait such as cash cards, employment identity cards, student identity cards, personal membership cards, residency certificates, various types of driving licenses, and various certificates of qualifications. Other applications, in the medical field, are for purposes of identification, such as image sheets, image display boards and display labels.

2. Description of the Related Art

In recent years, along with the development of image forming techniques, means have been developed of forming a considerable number of images of a uniform quality at a low price by using various printing methods such as intaglio printing, relief printing, planographic printing, gravure printing, and screen printing. These printing methods are also often used in surface printing of information media which store predetermined information, and which are communicable with external devices in either a contact or non-contact manner. Examples of such media are integrated circuit cards, magnetic cards, optical cards and cards in which at least two of these categories of card are combined.

However, screen printing, for example, requires substantial numbers of printing plates, of a quantity identical to the number of images to be printed, and, in the case of color printing, screen printing further requires printing plates of a quantity identical to the number of colors to be used in each image. Accordingly, these printing methods are unsuitable for printing of personal identification information on an individual basis (e.g., facial portraits, names, addresses, dates of birth, and various types of license).

The image forming method which is generally used at the present time to print such information is one in which printers print images by a sublimation type thermal transfer system using an ink ribbon, or by a fusion type thermal transfer system. By using such printing methods, personal identification information can be easily printed. However, when a printing speed is increased, the quality of resolution is diminished. On the other hand, when the quality of resolution is enhanced, the printing speed is reduced.

In contrast, in an image forming (printing) method using an electrophotographic system, the surface of an image holding member is electrostatically and uniformly charged, and exposed to light according to an image signal. An electrostatic latent image is formed by the difference in electric potential between exposed portions and unexposed portions, and then electrostatically developed with colored powder (image forming material), called a toner, and having a polarity opposite to, (or the same as), that of the charged portions of the image holding member. As a result, a visible image (toner image) is formed on the image holding member surface. In circumstances when a color image is formed, these steps can be repeated several times, or alternatively image forming units can be arranged in parallel so as to form visible color images. The visible color images are transferred and fixed onto an image recording medium so that a full color image is obtained. In this context, fixing means melting the colored powder, mainly by heat, and then cooling it.

Since, as mentioned above, in the electrophotographic system, the electrostatic latent image is electrically formed on the image holding member surface according to an image signal, identical images can be repeatedly formed, and, as and when different images are required, the can also be easily formed. Further, the toner image on the image holding member surface can be almost completely transferred onto the surface of the image recording medium, and a minute amount of toner remaining on the image holding member surface can be easily removed by a resin blade, or by a brush. Accordingly, printed materials for multi-product small-batch production can easily be manufactured.

The toner is usually formed by melting and mixing a hot-melt resin and a pigment, together with on occasions optional additives such as a charge control agent, and then grinding the resultant kneaded matter into particles. Further, an electrostatic latent image obtained by means of the electrophotographic system has a much higher degree of resolution than the particulate toner, and thus a satisfactory degree of resolution can be expected even when compared with the degree of resolution obtained both in screen printing and in thermal transfer using an ink ribbon.

As for color images, color toners having four primary colors, namely cyan, magenta, yellow and black, can be used. By mixing these toners, colors similar to those obtained by printing can theoretically be reproduced. As for the color toners, since a toner resin and a pigment can be mixed comparatively freely, an image masking property of the toners can easily be enhanced.

Examples where various cards printed by use of the electrophotographic device described above include the following.

One method has been suggested in Japanese Patent Application Laid-Open (JP-A) No. 2001-92255 in which not only various kinds of personal information but also an invisible bar code are printed by means of the electrophotographic method on a polyvinyl chloride sheet of a thickness of 250 μm, or on a polyester sheet of a thickness of 280 μm, and a film is then laminated on the printed surface of the sheet by a hot-press machine.

However, since a friction coefficient between the sheets is too extreme, and the sheets accordingly adhere to each other, the conveyance properties of the sheets are poor and the electrophotographic device may on occasions stop. Moreover, it is difficult to transfer satisfactorily an image forming material (toner) onto an insulator (sheet) of a thickness of 250 μm or more, and on occasions defects in images may increase. Further, when an attempt is made to use an electrophotographic device to print an image on a resin film which is softened at a comparatively low temperature, a fixing temperature in a fixing step can be higher than the softening temperature of the film, and therefore the film may soften, and may adhere to and wind around a fixing unit, causing jamming. Moreover, the image forming material may offset onto the fixing unit, and furthermore, when fixing of a sheet of a thickness of 250 µm is continued, an edge (corner) of the sheet may damage the fixing unit excessively.

It has also been suggested that personal identification information be printed on a sheet which transmits light, and that printing be executed by using a reflected image (for example, see JP-A No. 11-334265). However, as regards the sheet which transmits light, this application merely discloses that at least a part of the sheet is preferably a biaxially oriented polyester film, or a film in which the biaxially oriented polyester film is combined with a film made of ABS or polyester, but may be polyvinyl chloride.

Therefore, since the film in this specification is simply an insulator, defects occur during the transfer of the image forming material onto the film surface, and thus it is not possible to secure a degree of resolution equivalent to that obtainable with a thermal transfer system. Further, the laminate sheet used in this device, in which emphasis is placed on an improvement in productivity, is in the form of a roll. Therefore, in order to cope with an emergency or with multi-product production in which different data for different persons needs to be printed on cards, considerable loss and waste may occur.

Furthermore, consideration has barely yet been given to the question of automatizing not only the image forming onto the film which transmits light but also the steps of transporting and laminating the film, which transmits light and onto which an image has been formed, and a core sheet (base material). From the viewpoint of improving productivity, it is necessary to re-appraise the above steps and to design a manufacturing apparatus.

With regard to a manufacturing apparatus for automatizing the laminating step, for example, a device has been suggested in which a pair of upper and lower rollers on an inlet side and a pair of upper and lower rollers on an outlet side are held up in parallel, and an endless belt is wound around at least the lower roller on the inlet side and the lower roller on the outlet side, and the rollers on the inlet side are used as a heating unit and the rollers on the outlet side are used as a cooling unit (for example, see JP-A No. 2-25331.

However, from the viewpoint of costs, the endless belt used in the above apparatus is generally formed by welding a metal plate of stainless steel. On such an endless belt, the welded joint portion is not level with other portions. When the uneven joint portion is opposed to the plastic sheet manufactured at the time of lamination, a trace of the uneven joint portion remains on the plastic sheet manufactured, and thus this sheet can turn into a defective product.

Accordingly, there is a need for a plastic sheet manufacturing method and a plastic sheet manufacturing apparatus with which plastic sheets of a high degree of resolution, can be consistently manufactured to a high level of productivity, without producing defective products.

There is also a need for a plastic sheet manufacturing apparatus which, even when used together with an image forming device which is not significantly different from a conventional electrophotographic device, can consistently manufacture plastic sheets of a high degree of resolution to a high level of productivity, without producing defective products.

SUMMARY OF THE INVENTION

A first aspect of the present invention provides a plastic sheet manufacturing method whereby a layered body including a film is made to pass through a nip portion formed by a pair of belts equipped with a joint portion and thereby integrated to manufacture a plastic sheet, the method including: before integration, detecting a position of the joint portion; and controlling a timing at which the layered body enters the nip portion in accordance with a detected position.

A second aspect of the invention provides a plastic sheet manufacturing method including: electrophotographically forming an image on at least one surface of a film; superimposing the film on a core sheet so that the image abuts on the core sheet, to form a layered body; detecting a position of a joint portion, a pair of belts, which is used to integrate the layered body, having the joint portion; controlling a timing at which the layered body enters a nip portion formed by the pair of belts in accordance with a detected position; making the layered body to pass through the nip portion at a controlled timing so as to integrate the layered body and manufacture a plastic sheet; and cutting the plastic sheet into a predetermined size, or into a predetermined number of sheets.

A third aspect of the invention provides a plastic sheet manufacturing apparatus for making a layered body including a film pass through a nip portion formed by a pair of belts equipped with a joint portion so as to integrate the layered body and manufacture a plastic sheet, the apparatus including: a detection sensor for detecting a position of the joint portion; and a timing controller for controlling a timing at which the layered body enters the nip portion, in accordance with results outputted by the detection sensor.

According to the invention, since a timing at which the layered body enters the nip portion can be controlled in accordance with results outputted by the detection sensor that detects a position of the joint portion, the layered body can be prevented from being placed on the joint portion.

A fourth aspect of the invention provides a plastic sheet manufacturing apparatus, including: an image forming section for electrophotographically forming an image on at least one surface of a film; a superimposing section for superimposing the film on a core sheet so that the image abuts on the core sheet, to form a layered body; and an integrating section for making the layered body pass through a nip portion formed by a pair of belts equipped with a joint portion so as to integrate the layered body and manufacture a plastic sheet, wherein the integrating section includes a detection sensor for detecting a position of the joint portion and a timing controller for controlling a timing at which the layered body enters the nip portion, in accordance with results outputted by the detection sensor.

According to the invention, when the layered body obtained by superimposing on the core sheet the film on which the image has been electrophotographically formed is made to pass through the nip portion formed by the pair of belts equipped with the joint portion so as to integrate the layered body, in accordance with results outputted by the detection sensor which detects the joint portion, the timing at which the layered body enters the nip portion can be controlled. Accordingly, the layered body can be prevented from being placed on the joint portion.

As described above, the invention provides a plastic sheet manufacturing method and a plastic sheet manufacturing apparatus whereby plastic sheets of a high degree of resolution can be consistently manufactured to a high level of productivity, without producing defective products.

Moreover, the invention also provides a plastic sheet manufacturing apparatus which, even when used together with an image forming device which is not significantly different from a conventional electrophotographic device, can consistently manufacture plastic sheets of a high degree of resolution to a high level of productivity, without producing defective products.

BRIEF DESCRIPTION OF THE DRAWINGS

Preferred embodiments of the invention will be described in detail based on the following figures, wherein.

DETAILED DESCRIPTION OF THE INVENTION

Embodiments of the present invention will be explained below with reference to the figures. The same components having similar functions are designated by the same reference numerals in all the figures, and explanations thereof may be therefore omitted. Both the plastic sheet manufacturing method of the invention and the plastic sheet manufacturing apparatus of the invention will be explained.

Figure 1:
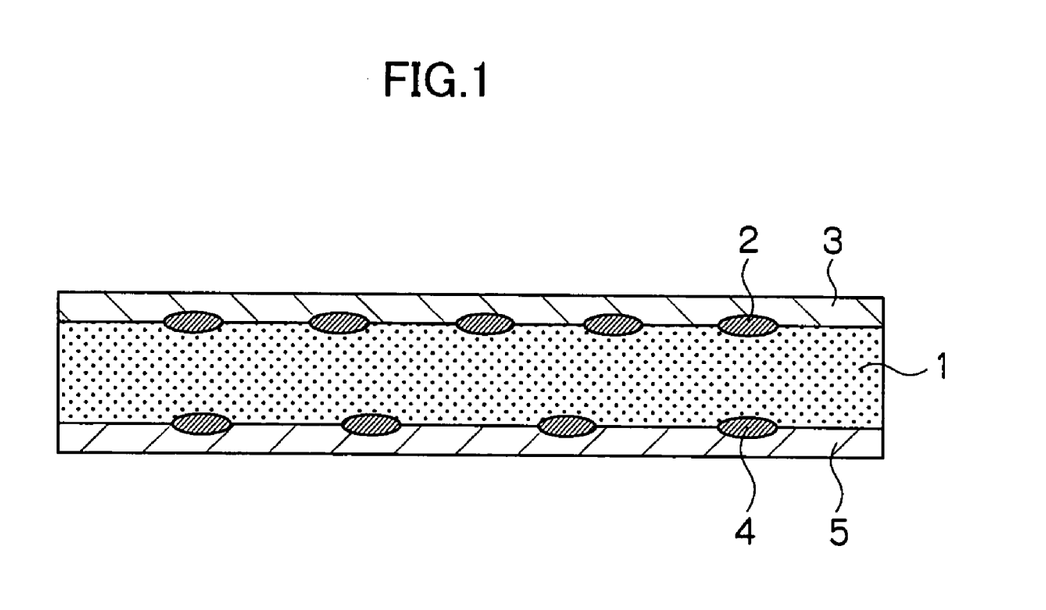
FIG. 1 is a sectional view of one example of a plastic sheet used in the invention.

The type of plastic sheet manufactured in the invention is not limited as long as it is formed from a layered body containing at least a film. For example, the plastic sheet may be a layered body having three layers, as shown in FIG. 1. FIG. 1 is a sectional view illustrating one example of the plastic sheet manufactured according to the invention. The plastic sheet shown in FIG. 1 is produced by superimposing, on a core sheet 1, a surface film 3 having thereon an image 2, and a rear surface film 5 having thereon an image 4 and the surface of the surface film 3 on which surface image 2 is formed and the surface of the rear surface film 5 on which surface image 4 is formed respectively face the core sheet 1. These sheets are then integrated. Both the surface film 3 and the rear surface film 5 are films which transmit light.

The plastic sheet manufactured in the invention may also have a structure in which the core sheet is imposed on a film which transmits light and on which an image is formed.

The surface on which an image is formed is not limited to one surface of the film which transmits light, and an image may be formed on each surface of the film.

Moreover, an image may, or may not, be formed on the film.

Figure 2:
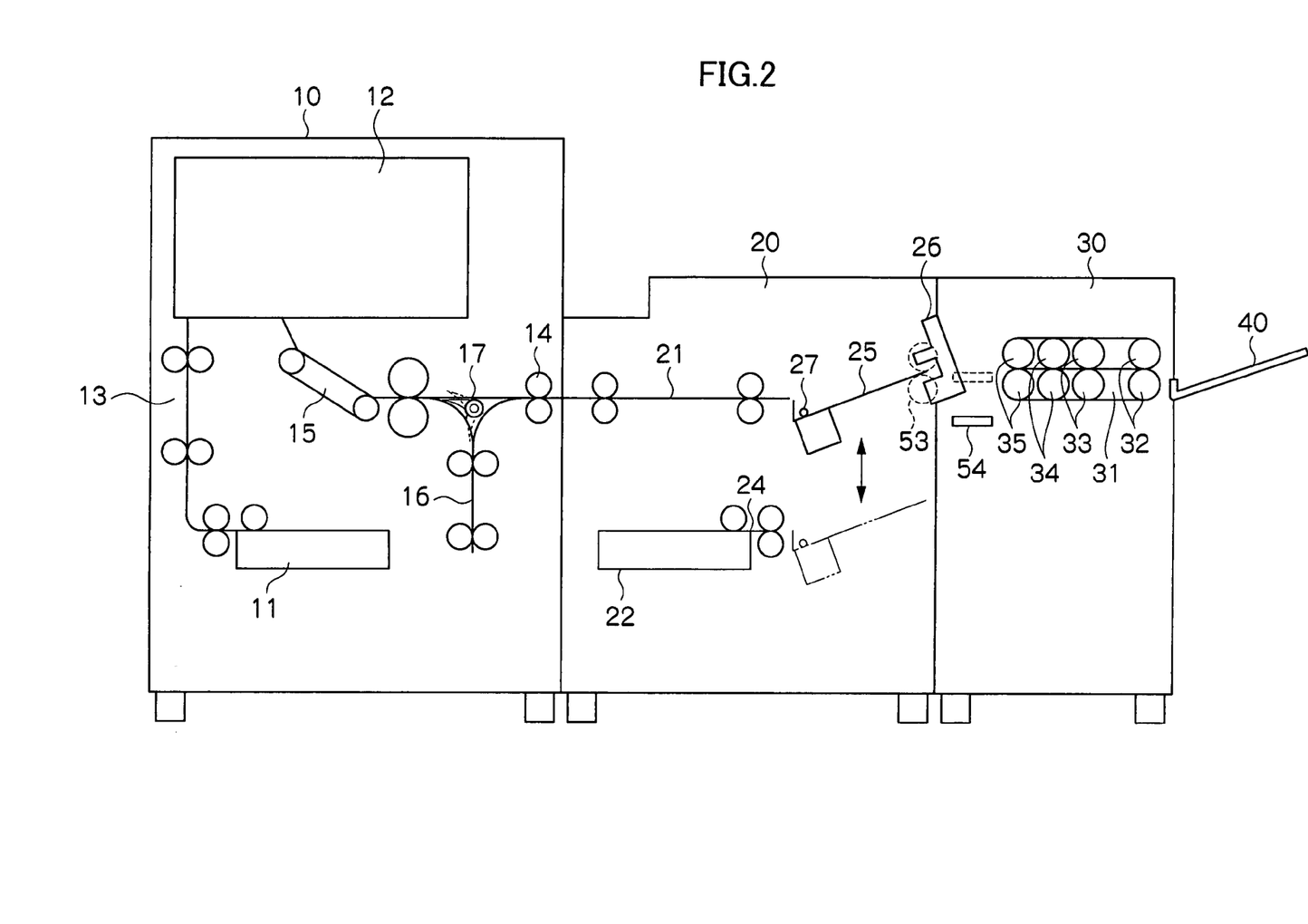
FIG. 2 is a diagram showing a schematic configuration of one example of a plastic sheet manufacturing apparatus according to the invention.

FIG. 2 is a diagram illustrating a schematic configuration of the plastic sheet manufacturing apparatus of the invention. The plastic sheet manufacturing apparatus, and the plastic sheet manufacturing method explained below, are used to produce the plastic sheet shown in FIG. 1 in which the core sheet is sandwiched between the two films, but the invention is not limited to such an apparatus, nor to such a method.

The plastic sheet manufacturing apparatus shown in FIG. 2 has an image forming device 10 including a film housing section and an image forming section, a collating device 20, and an integrating device (integrating section) 30.

The image forming device 10 has, for example, as main elements, a film stacker 11 (film housing section) holding the above-described sheets 3 and 5, an image forming section 12, a transport path 13 along which the sheets 3 and 5 are transported from the film stacker 11 to the image forming section 12, and a transport path 15 along which the films 3 and 5 on which images have been formed are transported from the image forming section 12 to the ejection port 14 of the image forming device 10. Other elements are omitted.

The image forming section 12 is a known electrophotographic image forming apparatus (not shown). The image forming apparatus includes a latent image holding member for forming a latent image, a developing unit for developing the latent image with a developer containing at least a toner so as to form a toner image, a transfer unit for transferring the developed toner image onto a film which transmits light, and a fixing unit for heating and pressing the film so as to fix the toner image on the film. The image forming apparatus may be an apparatus capable of forming color images.

Pairs of rollers including a pair of driving rollers (not shown), and guides (not shown) are provided along each of the transport paths 13 and 15. A reversal path 16 for reversing the transport direction of each of the films 3 and 5 by 180° branches from the transport path 15. A cam 17 for guiding the films 3 and 5 to either of the transport path 15 or the reversal path 16 is provided near the junction of the transport path 15 and the reversal path 16. When the film 3 or 5 has been reciprocated along the reversal path 16 and has been returned to the transport path 15, the edge of the film, which edge is disposed downstream in the transport direction of the film, has been changed from one edge to the other edge, and the surface of the film, which surface is disposed as the upper surface of the film, has been changed from one surface to the other surface, and then the film is transported along the transport path 15.

The collating device 20 has a core sheet stacker 22 holding core sheets 1, a collating tray 25 (superimposing section), a transport path 24 along which a core sheet 1 is transported from the core sheet stacker 22 to the collating tray 25, and a transport path 21 along which the films 3 and 5 ejected from the ejection port 14 are transported to the collating tray 25.

The transport paths 24 and 21 have an ejection portion. The ejection portion of the transport path 24, along which the core sheet 1 is transported from the core sheet stacker 22 to the collating tray 25, and the ejection section of the transport path 21, along which the films 3 and 5 are transported from the ejection port 14 of the image forming device 10 to the collating tray 25, are provided parallel in the vertical direction of the image forming device 10.

For example, transport rolls and a smooth plate member for guiding the films 3 and 5 along the surface thereof can be provided along the transport path 21. Alternatively, a rotating belt conveyor may be provided along the transport path 21. When the films 3 and 5 are being ejected from the image forming device 10, the transport rolls or the belt conveyor start to rotate so as to transport the films 3 and 5 to the collating tray 25.

The core sheet stacker 22 has a pickup roll or a paper feeding roll like ones possessed by ordinary paper feeding devices. After the collating tray 25 has been disposed near the ejection port of the core sheet stacker 22, the paper feeding roll immediately starts to rotate so as to transport the core sheet 1 to the collating tray 25.

For example, a part of one end of the collating tray 25 is connected with the outer wall of a belt which is vertically stretched (the vertical direction in FIG. 2). The collating tray 25 is disposed at an upper position near the transport path 21 or at a lower position near the transport path 24 according to vertical movement of the belt. Thereby, when the collating tray 25 is disposed at the upper position, the films 3 and 5 are supplied from the transport path 21 to the collating tray 25. Meanwhile, when the collating tray 25 is disposed at the lower position, the core sheet 1 is supplied from the transport path 21 to the collating tray 25. A device for changing the position of the collating tray 25 is not limited to the above-described belt and may be a known one such as a motor driving system. The collating tray 25 has a positioning unit 27 for positioning the rear end of a layered body including the core sheet 1, the surface film 3, and the rear surface film 5. The positioning unit 27 can protrude from the upper surface of the collating tray 25 and can also be accommodated in the collating tray 25 such that the upper surface of the positioning unit is level with the upper surface of the collating tray 25.

As shown in FIG. 2, a temporary fixing device 26 is disposed near the collating tray 25, and has, for example, a pair of protrusions which are made of metal, which can be heated by a heater and which can be moved so as to sandwich the front end of the layered sheet including the above-described three sheets, or to release the front end. Moreover, the temporary fixing device 26 is provided such that it can be moved from a first position at which the pair protrusions can sandwich, thermally melt and temporarily fix the front ends of the sheets to a second position at which the temporary fixing device 26 does not interfere with the transport of the temporarily fixed layered sheet to the integrating device 30. Moreover, the temporary fixing device 26 is disposed at the first position only at the time of temporary fixing, and is disposed at the second position in steps other than the temporary fixing step. Further, the temporary fixing device is connected to a moving unit (not shown) which is electrically connected to a controller 57 (FIG. 7) for controlling the drive of the temporary fixing device 26. The controller later transmits a signal to a timing controller 54 when the layered body has been just temporarily fixed (when the collation of the layered body has been completed).

In this structure, a sheet 4 is fed from the sheet stacker 11 and an image is formed on the upper surface of the sheet 4. Thereafter, the sheet 4 is transported along the transport path 21. At this time, the collating tray 25 has been disposed at the upper position. Therefore, the sheet 4 is supplied to the collating tray 25 such that the image is disposed on the upper surface of the sheet 4.

Next, the collating tray 25 is shifted to the lower position. Then, a core sheet 1 is fed from the core sheet stacker 22, and is supplied to the collating tray 25 and is put on the sheet 4.

Thereafter, the collating tray 25 is returned to the upper position. a sheet 3 is fed from the sheet stacker 11 and an image is formed on the upper surface of the sheet 3. Thereafter, the sheet 3 is transported along the transport path 21. At this time, the sheet 3 is reversed by using the reversal path 16. Therefore, the sheet 3 is supplied to the collating tray 25 such that the image is disposed on the lower surface of the sheet 4. Thus, a layered body including the three sheets is prepared. At this time, the layered body is also positioned by the positioning unit 27.

The integrating device 30 has a pair of belts 31, a pair of tension rolls 32, a pair of cooling rolls 33, a pair of heating and pressing rolls 34, and a pair of inlet rolls 35. Hereinafter, these paired members may be simply described as the belts 31, the tension rolls 32, the cooling rolls 33, the heating and pressing rolls 34 and the inlet rolls 35. At least one roll of the paired inlet rolls 35 is connected to a motor (not shown). Thereby, the at least one roll is rotated by the motor and causes the other rolls to rotate.

The integrating device 30 has a belt nip system including the pair of belts 31, so that plastic sheets can be easily manufactured on line.

The integrating device 30 also has a pair of rolls 53, which can be moved from a first position, at which it is disposed on a path from the collating tray 25 to the belt nip system, to a second position at which it deviates from the path. When the temporary fixing device 25 is disposed at the first position, the pair of rolls 53 is disposed at the second position. Meanwhile, When the temporary fixing device 25 is disposed at the second position, the pair of rolls 53 is disposed at the first position. One of the paired rolls 53 is connected to a motor (not shown) which is electrically connected to a motor driving unit 55 (FIG. 8). The motor driving unit 55 is electrically connected to the timing controller 54 (or 64) (FIG. 7 or 8) described later.

The integrating device 30 also includes a guide 54 between the pair of rollers 53 and the belt nip system. The guide 54 can be moved from a first position at which it deviates from the path extending from the collating tray 25 to the belt nip system to a second position at which it is disposed under the path to guide a temporarily fixed layered body. When the pair of rollers 53 is disposed at the first position, the guide 54 is disposed at the second position. Meanwhile, when the pair of rollers 53 is disposed at the second position, the guide 54 is disposed at the first position.

A plastic sheet in which the layered body has been integrated (or bonded together) by the integrating device 30 is ejected from the integrating device to an ejection tray 40.

As a method for pressing and bonding the layered body used in the integrating device 30, a method is used in which the heating and pressing rolls 34 disposed downstream with respect to the inlet rolls 35 heat and press the layered body. By being subjected to the pressing and bonding step, the layered body is thermally fused. When the layered body is placed on a joint portion of the belts and pressed and bonded, the joint portion is uneven, resulting in uneven pressure on the nip formed between the heating and pressing rolls. As a result, traces of the joint portion remain on the resultant integrated body.

In order to prevent the above problem, the invention is characterized in that, when the layered body is to pass through the nip portion, a timing at which the layered body enters the nip portion is controlled so that the layered body is not placed on the joint portion.

Specifically, the integrating device 30 can have a timing controlling unit. The timing controlling unit has a detection sensor for detecting positions of joint portions and a timing controller for controlling, in accordance with results outputted by the detection sensor, a timing at which the layered body enters the nip portion. Alternatively, the timing controlling unit can have a device for measuring in advance transport speeds in all the steps conducted by the plastic sheet manufacturing apparatus, and a controller for controlling a timing at which the layered body is supplied to the integrating device 30 so that the layered body is not placed on a joint portion. In this case, the timing controlling unit can also have a device for stopping and driving individually a part or the whole of the rollers in the plastic sheet manufacturing apparatus.

Among them, a combination of the detection sensor and the timing controller is preferable. More specifically, the timing controller includes a gate at the inlet of the integrating section 30 and opens or closes the gate in accordance with results outputted by the detection sensor so as to control a timing at which the layered body enters the nip portion (Structure A). Alternatively, the timing controller includes a controller for controlling rotating speed(s) of the pair of belts equipped with joint portions, and the controller increases or decreases the rotating speed(s) of the pair of belts in accordance with results outputted by the detection sensor so as to control a timing at which the layered body enters the nip portion (Structure B).

In simple terms, the timing control unit having the above configuration conducts: a step of detecting the positions of the joint portions by using the detection sensor, and a timing control step of controlling, in accordance with results outputted by the detection sensor, a timing at which the layered body enters the nip portion.

According to Structure A, the gate provided at the inlet of the integrating section 30 is opened or closed in accordance with results outputted by the detection sensor, so that a timing at which the layered body enters the nip portion can be controlled. Accordingly, the layered body can be prevented from being placed on the joint portions.

According to Structure B, the controller for controlling the rotating of the pair of belts increases/decreases the rotating speed(s) of the pair of belts in accordance with results outputted by the detection sensor so as to control a timing at which the layered body enters the nip portion. Accordingly, the layered body can be prevented from being placed on the joint portions.

Figure 3:
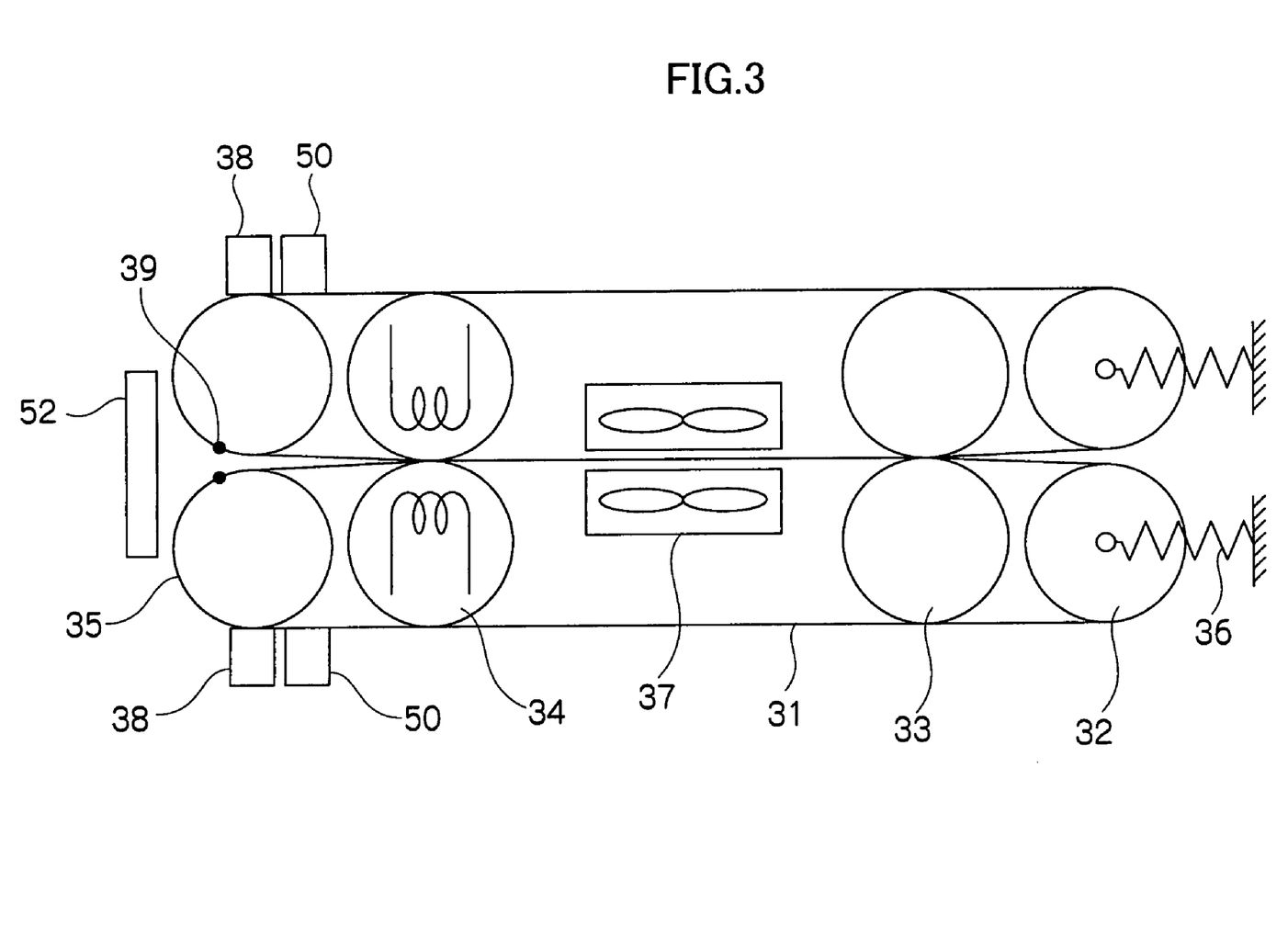
FIG. 3 is a diagram showing a schematic configuration of the integrating section in a first embodiment.

Embodiments (first and second embodiments) using these timing controlling units having Structures A and B will be explained in detail with reference to FIGS. 3 to 5.

First Embodiment

The timing controlling unit (Structure A) which includes the detection sensor and the timing controller having the gate will be explained with reference to FIG. 3. FIG. 3 is a sectional view illustrating one example of the integrating device 30 (integrating section).

Each of the belts 31 which are endless belts is wound around one of the tension rolls 32 and one of the inlet rolls 35 in a tension state, and the integrating device also has tension springs 36 to prevent the belts 31 from becoming distorted. The heating and pressing rolls 34 and the cooling rolls 33 are respectively arranged between corresponding one of the tension rolls 32 and corresponding one of the inlet rolls 35 in corresponding one of the belts 31 such that the heating and pressing rolls 34 press and are brought into contact with each other via the belts 31, and such that the cooling rolls 33 press and are brought into contact with each other via the belts 31. The tension rolls 32 are spaced apart from each other and away from the pair of belts 31 so as not to form a nip. Moreover, the inlet rolls 35 are spaced apart from each other and away from the pair of belts 31 so as not to form a nip. As a result, even if the belts 31 snake during the course of continuous operations, they can be returned to predetermined positions while they are still being operated.

The method for preventing the belts 31 from shifting to predetermined positions is not shown, but the integrating device may include a stopper to prevent the belts 31 from shifting from predetermined positions. Alternatively, tension springs can be disposed on the right and left sides of the belts 31 and the spring forces of the tension springs can be controlled so as to prevent the belts 31 from snaking.

Figure 7:
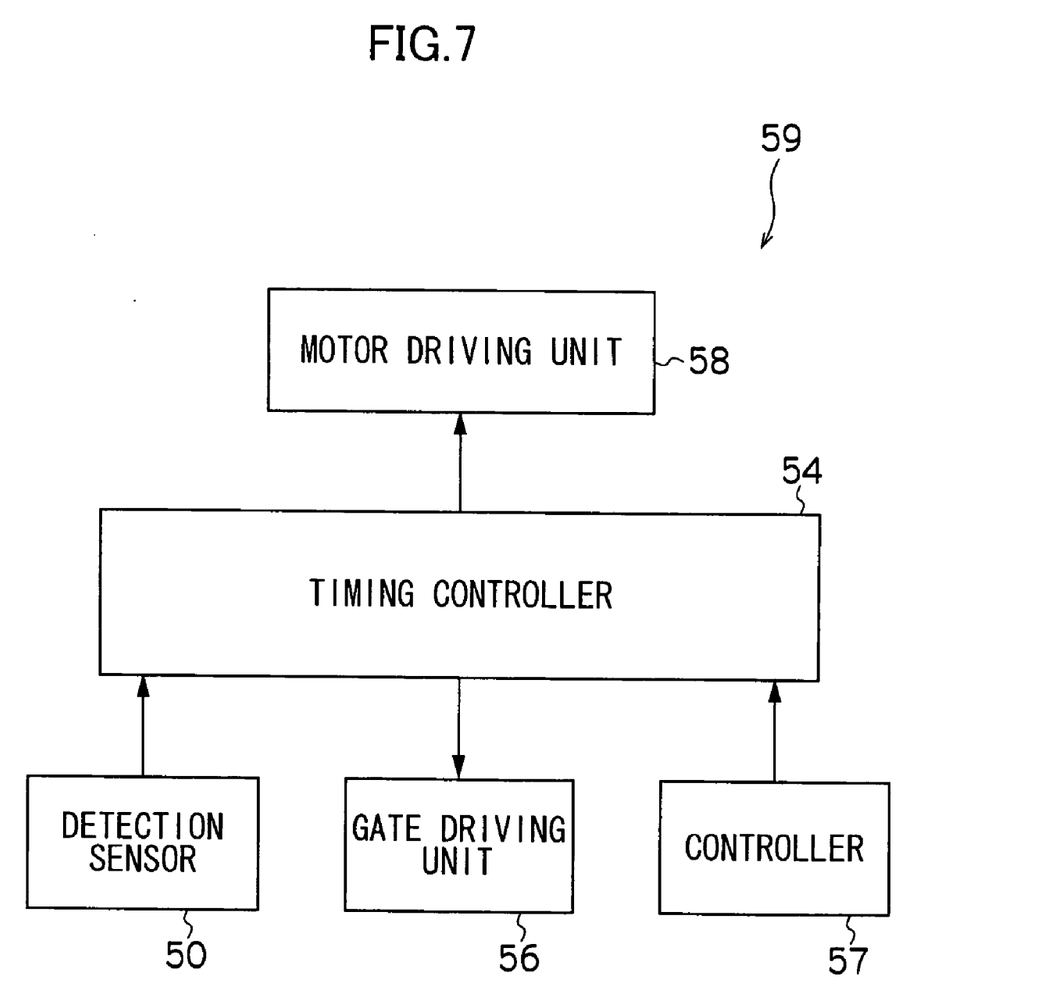
FIG. 7 is a block diagram of the timing controlling unit of the first embodiment.
Figure 8:
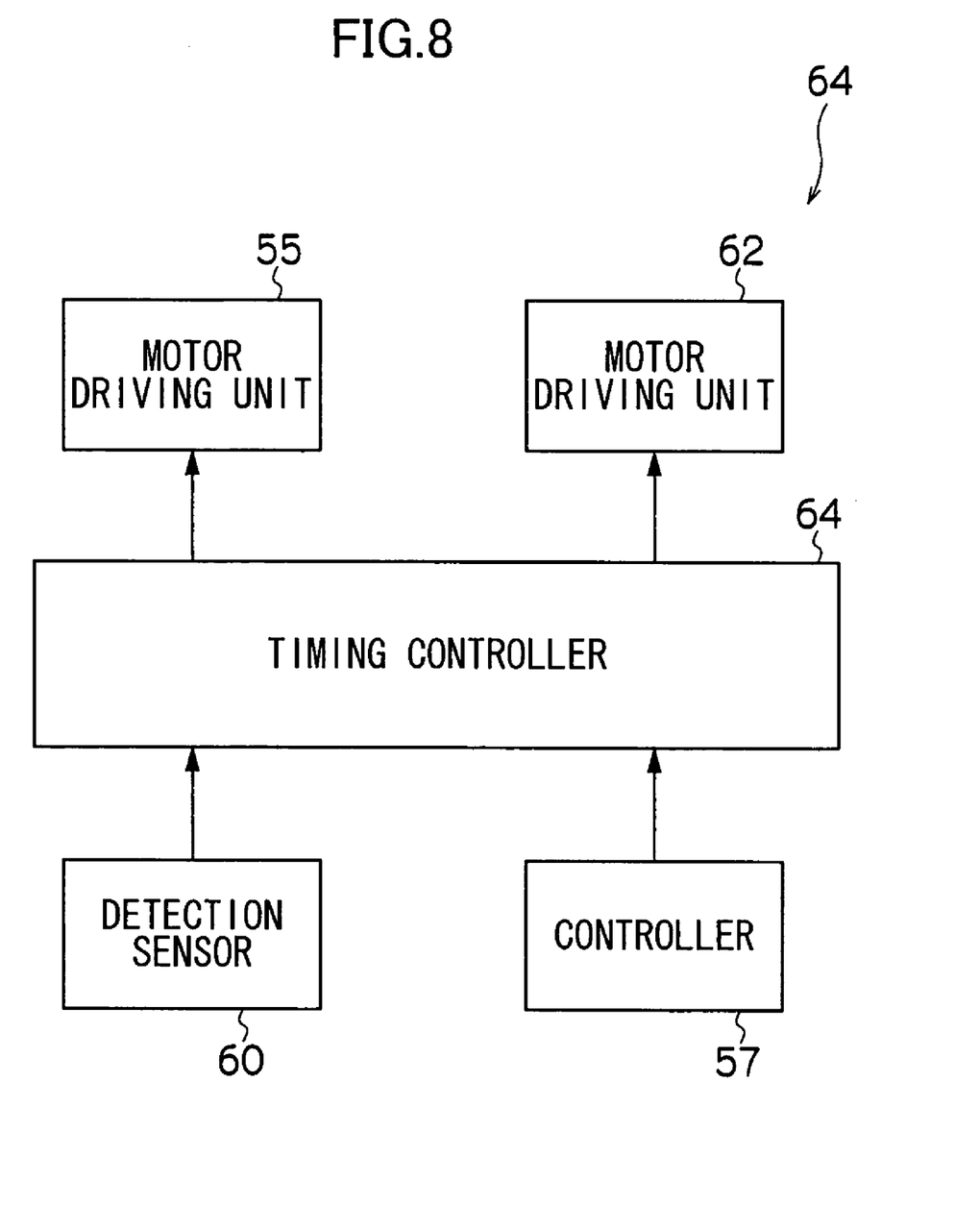
FIG. 8 is a block diagram of the timing controlling unit of the second embodiment.

In the first embodiment, as shown in FIG. 7, the integrating device 30 has a timing controlling unit. The timing controlling unit has a detection sensors 50 each of which detects that the joint portion 39 of the belt 31 is just under or above the corresponding detection sensors 50, and the above-described timing controller 54. The detection sensors 50 are electrically connected to the timing controller 54 (FIG. 7). Each of the detection sensors 50 can be a device which detects that the joint portion is being disposed under or above the device, for example, by measuring the distance between the belt 31 and the device in a non-contact manner. The integrating device has a gate 52 (FIG. 3) which is disposed upstream with respect to the inlet rolls 35 and which can be opened and closed. The gate is connected to a gate driving unit 56 (FIG. 7), which is electrically connected to the timing controller 54. According to results outputted by the detection sensor 50 and the signal from the controller 57, the timing controller instructs the gate driving unit 56 to open or close the gate 52 disposed at the inlet of the integrating device 30. The first embodiment conducts a step of detecting positions of the joint portions 39 by using the detection sensors 50, and a timing control step of opening or closing the gate 52 so as to control, in accordance with results outputted by the detection sensors 50, the timing at which the layered body enters the nip portion.

Figure 4:
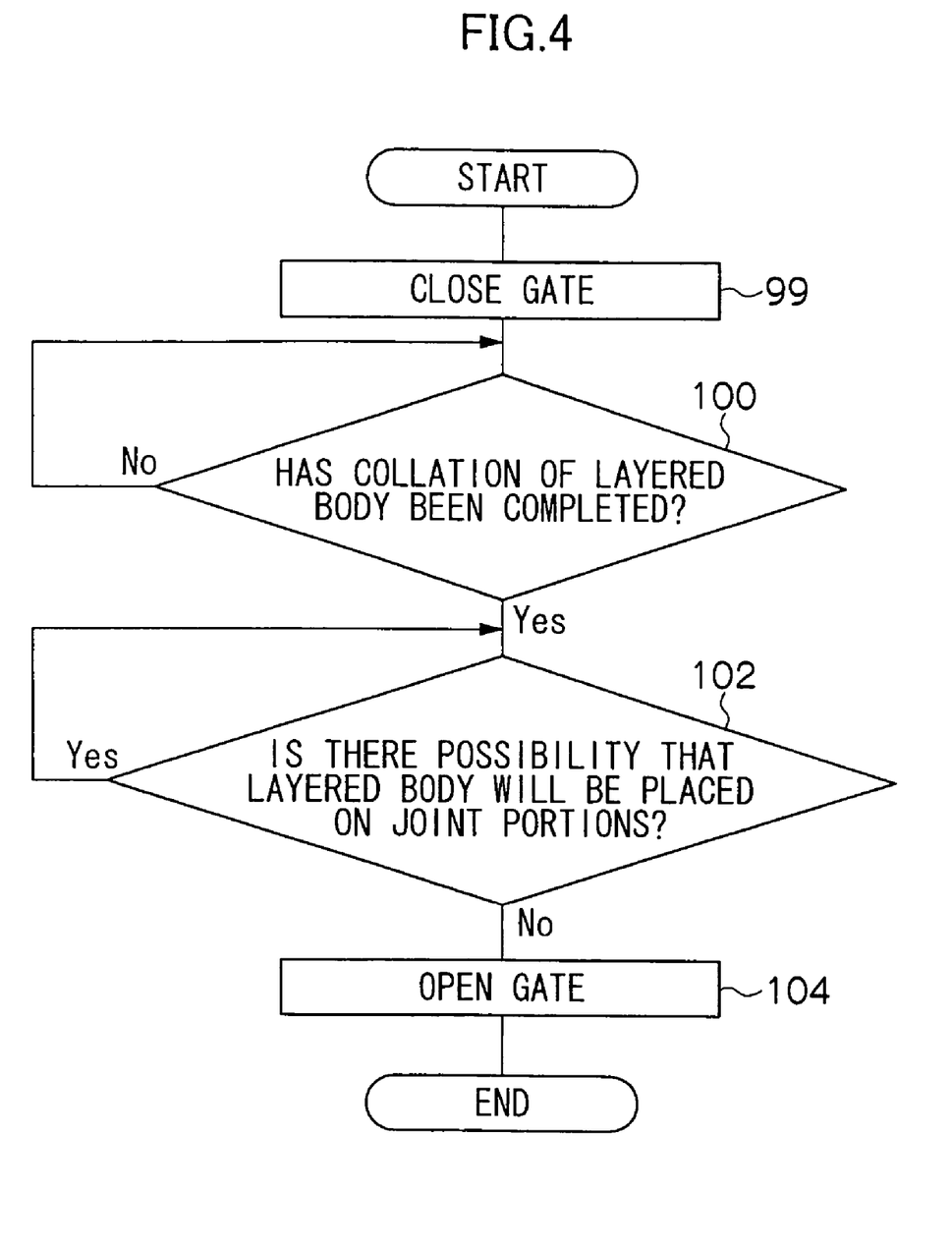
FIG. 4 is a flowchart showing steps of the integrating section in the first embodiment.

More specifically, in the first embodiment, the timing is controlled in accordance with steps of the timing controller, as shown in FIG. 4.

At step 99, the gate 52 is closed and drive of the pair of rolls 53 is stopped At step 100, it is determined whether or not the timing controller has received, from the controller 57 in the collating device 20, a signal showing that collation of a layered body has been completed (whether a layered body has been temporarily fixed). When it is determined that collation of the layered body has been completed, it is determined from the results outputted by the detection sensors 50 whether or not there is a possibility that the layered body will be placed on the joint portions 39 at step 102. More specifically, this step includes, for example, a sub step of determining that the joint portions 39 are being disposed under or above the detection sensors 50, and another sub step of determining that a predetermined time has been lapsed since the detection. The predetermined time is needed for the joint portions 39 to shift from positions under and above the detection sensors to predetermined positions, for example, positions near the heating and pressing rolls 34. The predetermined positions are such that, when the joint portions have been disposed at those positions, and then the gate is opened, and the layered body enters the integrating device 30, the layered body can be prevented from being placed on the joint portions 39. When it is determined that the layered body will not be placed on the joint portions 39, the gate 52 is opened at step 104. Then, the layered body passes through the gate 52 and the nip portion and are integrated. The timing control has been thus completed.

In contrast, at step 102, when it is determined that there is a possibility that the layered body will be placed on the joint portions 39, the gate is kept closed, and drive of the pair of rolls 53 is kept stopped. That is to say, the transportation of the layered body to the nip portion is stopped. At step 102, when it is determined that there is no possibility that the layered body will be placed on one of the joint portions 39, but when it is determined that there is a possibility that the layered body will be placed on the other of the joint portions 39, the sequence (step of controlling timing) cannot proceed to the next step 104. Step 102 is repeatedly conducted until it is determined that there is no possibility that the layered body will be placed on the joint portions 39.

Since timing control is conducted in such a manner, the layered body is prevented from being placed on the joint portions.

When the layered body passes through the heating and pressing rolls 34, or between the cooling rolls 33, the layered body which is being thermally fused is nipped between the heating and pressing rolls 34, or between the cooling rolls 33, so that the layered body is not deformed. The layered body passes through the nip formed between the cooling rolls 33 while the layered body is kept flat. In order to promote cooling of the layered body, each of cooling fans 37 is provided between corresponding one of the heating and pressing rolls 34 and corresponding one of the cooling rolls 33 (when the cooling fans 37 are not provided, the layered body is naturally cooled). A cleaning device 38 is provided in order to remove dirt adhering to the belts 31 during continuous operations.

A layered body which has been subjected to the thermal fusing step and the cooling step has been integrated while the layered body is kept flat. Then, the layered body is ejected from the integrating device 30 to the ejection tray 40, so that a plastic sheet can be obtained. A step of cutting the obtained plastic sheet into pieces of a predetermined size, or into a predetermined number of sheets, may be conducted. A cutter can be used in this step.

For example, when different images are formed on a plastic sheet, the plastic sheet can be cut into pieces having only one image, and of a predetermined size. Alternatively, when the plastic sheet has a pattern of multiple cards, the sheet can be cut into a desired number of cards, each having as front and rear surfaces thereof films which transmit light.

Second Embodiment

The timing controlling unit (Structure B) including the detection sensor and the controller for controlling a rotating speed of the pair of belts will be explained with reference to FIG. 5. FIG. 5 is a sectional view illustrating another example of the integrating device (integrating section) used in the invention.

Figure 5:
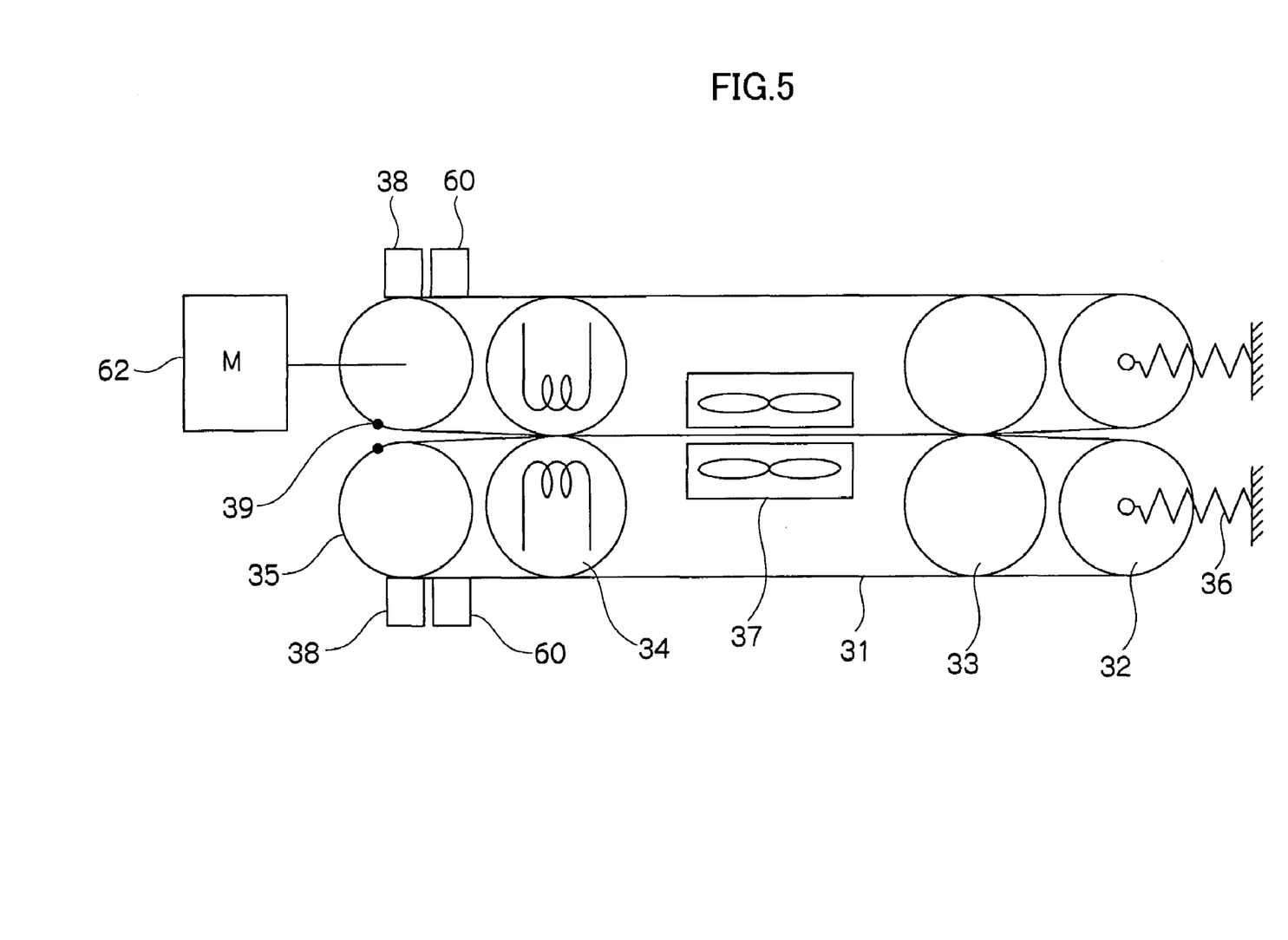
FIG. 5 is a diagram showing a schematic configuration of the integrating section in a second embodiment.

In the second embodiment, as shown in FIG. 5, the timing controlling unit has detection sensors 60 for detecting that the joint portion 39 is just under or above the corresponding detection sensor 60, a timing controller 64 (FIG. 8), and a motor driving unit 62 which is connected to the motor connected to the at least one of the inlet rolls 35. The timing controller 64 is electrically connected to the motor connected to the at least one of the inlet rolls 35. The timing controller 64 and the motor driving unit 62 serve as a speed controller for controlling the rotating speed of the pair of belts. The detection sensors 60 are electrically connected to the timing controller 64. Moreover, the timing controller 64 receives, from the controller 57 in the collating device 25, the signal showing that a layered body has been temporarily fixed. When the timing controller has received the signal from the controller 57, the timing controller instructs, in accordance with results outputted by the detection sensor 60, the motor driving unit 62 to increase or decrease the rotating speed of the motor so as to increase or decrease the rotating speed of the belts 31. The second embodiment conducts a step of detecting positions of the joint portions 39 by using the detection sensors 60, and a timing control step of increasing or decreasing the rotating speed of the pair of belts 31 by using the motor driving unit 62 so as to control a timing at which the layered body enters the nip portion, in accordance with results outputted by the detection sensors 60.

Since the members other than the members described here are similar to those in the first embodiment, explanations thereof are omitted. The process after integration is also similar to that in the first embodiment, and explanations thereof are therefore omitted.

Figure 6:
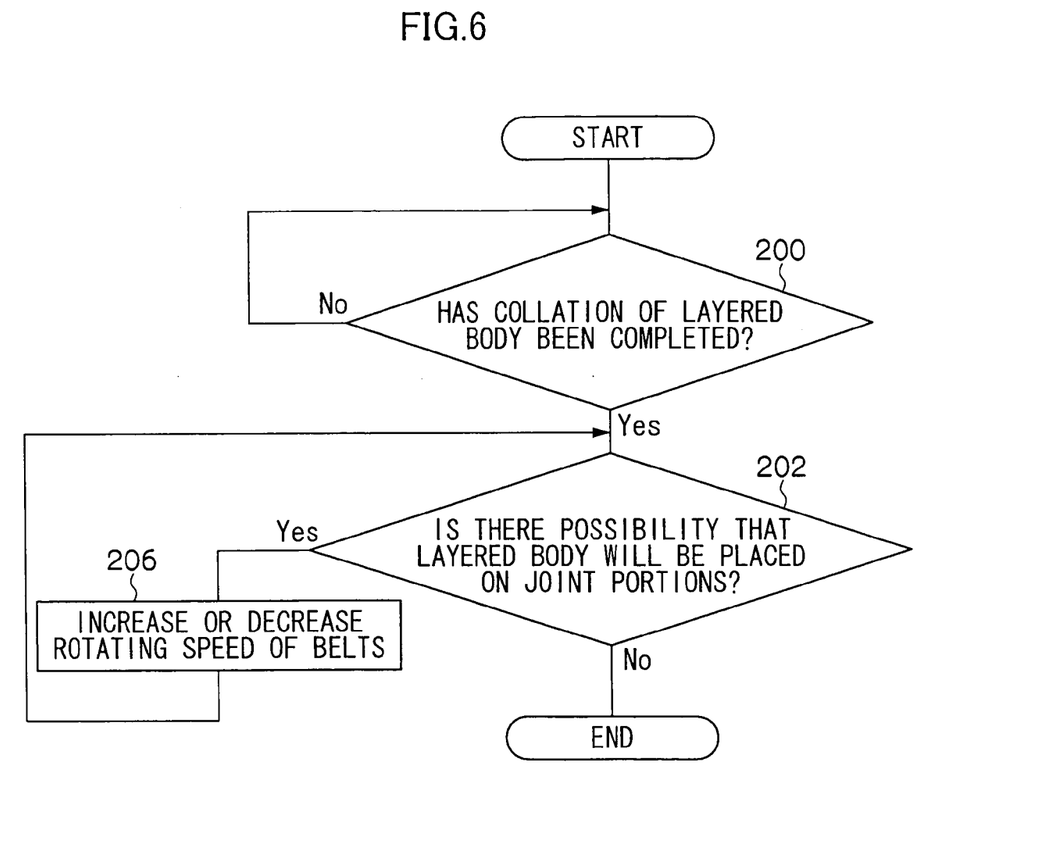
FIG. 6 is a flowchart showing steps of the integrating section in the second embodiment.

More specifically, in the second embodiment, timing is controlled by steps of the timing controller 64, as shown in FIG. 6.

At step 200, it is determined whether or not the timing controller has received, from the controller 57 in the collating device 20, a signal showing that collation of a layered body has been completed (whether a layered body has been temporarily fixed). When it is determined that the collation of the layered body has been completed, it is determined at step 202 from results outputted by the detection sensors 50 whether or not there is a possibility that the layered body will be placed on the joint portions 39. When it is determined that the layered body will not be placed on the joint portions 39, a rotation speed of the belts 31 is maintained, and the layered body passes through the nip portion and is integrated. The timing control has been thus completed. At step 202, when it is determined that there is no possibility that the layered body will be placed on one of the joint portions 39, but when it is determined that there is a possibility that the layered body will be placed on the other of the joint portions 39, the sequence (step of controlling timing) cannot end.

At step 202, when it is determined that there is a possibility that the layered body will be placed on the joint portions 39, the timing controller instructs the motor driving unit 62 to increase or decrease the rotating speed of the motor connected to the at least one roll of the paired inlet rolls 35 so as to increase or decrease the rotating speed of the belts 31 at step 206. For example, when there is a possibility that the front end of the layered body in the transport direction of the layered body will be placed on the joint portions 39, the rotating speed of the belts 31 is increased and the joint portions 39 are advanced more quickly. As a result, the layered body is prevented from being placed on the joint portions 39 in the nip portion. When there is a possibility that the rear end of the layered body in the transport direction will be placed on the joint portions 39, the rotating speed of the belts 31 is decreased and the joint portions 39 are advanced more slowly. As a result, the layered body is prevented from being placed on the joint portions 39 in the nip portion. After step 206 has been conducted, the sequence returns to step 202.

Since timing control is conducted in such a manner, the layered body is prevented from being placed on the joint portions.

Thus, in the first and the second embodiments, the layered body is prevented from being placed on the joint portions 39 of the belts 31. Accordingly, traces of joint portions can be prevented from remaining on a plastic sheet manufactured, and production of defective products is thus prevented.

In the second embodiment, the rotating speed of the belts 31 is increased or decreased to control timing at which the layered body enters the nip portions. Alternatively, the transport speed of the layered body can be increased or decreased to control the timing. Alternatively, the rotating speeds of the belts and the layered body can be increased or decreased.

In the first and the second embodiments, in order to take maximum advantage of the belts 31, a pair of belts is preferably rotated in such a way that, within the nip portion, the joint portions 39 contact with, or adjoin, each other. As shown in FIGS. 3 and 5, when the paired belts 31 have the same size, the pair of belts 31 is preferably initially disposed such that the joint portions 39 contact with, or adjoin, each other, and the paired belts 31 are thus rotated at the same speed.

In this case, providing either of the joint portions 39 with one detection sensor 50 is sufficient to detect a position of the other joint portion and to conduct the timing control described above. As a result, the configuration of the device can be simplified.

When the joint portions 39 adjoin each other in the nip portion, the distance between the joint portions 39 (distance between the front end of one of the joint portions 39 and the rear end of the other of the joint portions 39) is determined on the basis of the size (length) of the joint portions in a rotating direction of the belts 31 and the length of the layered body to be integrated in a travelling direction. However, in general, the distance is preferably 200 mm or less, more preferably 100 mm or less, and still more preferably 50 mm or less.

More specifically, the length of the joint portions in a rotating direction is usually about 1 mm. When the length of the layered body to be integrated in the travelling direction is made to be the longitudinal length of A4 paper, the distance between the joint portions is preferably 150 mm or less, more preferably 75 mm or less, and still more preferably 40 mm or less.

In the invention, it is also preferable that the belts 31 are made of a metal material with a modest thermal deformation capacity. However, a plastic material may be used as long as its thermal deformation capacity is reduced by mixing glass therewith. Each of the belts 31 is preferably an endless belt obtained by welding a stainless steel plate, since stainless steel has a small thermal deformation capacity, is easy to mold and the welding of the stainless steel plate can be inexpensively conducted.

Further, the embodiments described above are concerned about a case where images are formed on one surface of films which transmit light, and where the films and a core sheet are integrated such that the images face the core sheet. However, at least one image may be formed on one surface of at least one film which does not transmit light, the image surface may be opposite the surface facing the core sheet, and integration may be carried out in this state. In this case, it is preferable that a protective film is laminated on the image surface of the film.

Details of the core sheet and the film which transmits light are as follows.

Core Sheet

For the images formed on the film which transmits light to be clearly visible when the film(s) and the core sheet have been integrated to form a plastic sheet, the core sheet used in the invention is preferably opaque, and more preferably white.

As the material of the core sheet, a plastic is used. Specific examples of the material include an acetate film, a cellulose triacetate film, a nylon film, a polyester film, a polycarbonate film, a polystyrene film, a polyphenylene sulfide film, a polyplopyrene film, a polyimide film, and cellophane. Among them, a polyester film is preferably used. In particular, a biaxially oriented polyethylene terephthalate film is preferably used.

A pigment or a dye can be added to any of the materials of the core sheet to obtain a colored sheet. The core sheet may be in the form of a film or a plate, and should have adequate thickness to make the resultant sheet inflexible and strong enough to perform the functions expected of it.

The core sheet is preferably a film made of a plastic, with a thickness in the range of about 50 to about 5000 µm, and more preferably a PET film with a thickness in the range of about 100 to about 1000 µm.

When the plastic sheet of the invention is used as an integrated circuit card, or a magnetic card, as and when necessary, an integrated circuit chip, an antenna, a magnetic stripe or stripes, or an external terminal can be embedded in the core sheet. Moreover, a magnetic stripe, or a hologram may be printed on the core sheet and any necessary character information may also be embossed on the core sheet.

Film Which Transmits Light

A substrate which can be used for a film which transmits light must have transparency. In this context, the transparency means, for example, a property that transmits, to a certain extent, light having wavelengths in the visible light region. In the invention, the film needs to be transparent enough for formed images to be seen visually through the substrate from a surface of the substrate opposite to the surface on which the images are formed.

As the substrate, a plastic film which can be used as the material for the core sheet can be similarly used.

Among various kinds of plastic films, a polyester film, particularly, a film called PETG in which an ethylene glycol component of the monomers of PET (polyethylene terephthalate) is replaced with a 1,4-cyclohexane methanol component to an extent of about 50%, a film in which polycarbonate and PET are mixed with each other and alloyed, or amorphous polyester which is called A-PET and which is not biaxially oriented, can be preferably used.

Polyvinyl chloride which has conventionally been used as the material for core sheets (core) for cards is regarded as unfriendly in terms of the environment. This is because it generates dioxin when combusted at a time that combustible materials are disposed. Therefore, use of polyvinyl chloride has been reduced, and in such circumstances, materials such as polyester can play a role. In the invention, when consideration is given to the use of a core sheet containing no chlorine, materials which can be preferably used are a polystyrene resin film, an ABS resin film, an AS (acrylonitrile-styrene) resin film, or a film which is obtained by adding to a PET film, or to a polyolefin resin film made of polyethylene, or of polypropylene, a hot-melt adhesive such as polyester or EVA.

The Vicat softening temperature of the substrate is preferably in a range of about 70 to about 130° C., and more preferably in a range of about 80 to about 120° C.

When the Vicat softening temperature does not reach 70° C., there will be occasions during the integrating step when the laminated film does not make sufficient contact with or does not adhere satisfactorily to the core sheet (core). On the other hand, when the softening temperature exceeds 130° C., close contact and adhesion are sufficient, but an image (image forming material) or a coating layer, which is described later, can be excessively softened, and as a result, defects may occur on the image (image flow).

The Vicat softening temperature can be measured by one of the methods used in measuring the softening temperatures of thermoplastic resins. Methods of measuring the softening temperatures of thermoplastic resins can be used as a method of testing the heat resistance of formed plastic materials and are stipulated in JIS K7206, ASTM D1525 or ISO306, which are incorporated by reference herein.

The surface resistivity of at least one surface of the substrate is preferably in a range of about $10^8$ to about $10^{13}$ Ω, and more preferably in a range of about $10^9$ to about $10^{11}$ Ω.

When the surface resistivity is less than $10^8$ Ω, the resistivity of an image recording medium under conditions of high temperature and high humidity becomes too low, and a toner image obtained by transfer from a transfer member to a recording medium may be inferior. When, on the other hand, the surface resistivity exceeds $10^{13}$ Ω, the resistivity of a laminated film to be used as an image recording medium becomes too high. As a result, a toner may not be completely transferred from a transfer member to the film surface, and this kind of defective transfer may on occasions cause image defects.

The surface resistivity can be measured according to JIS K6911, which is incorporated by reference herein, by using a circular electrode (for example, "HR probe" of Hirester IP manufactured by Mitsubishi Petrochemical Co., Ltd.) under conditions of 23° C. and 55% RH.

In a laminated film for electrophotography, when only one surface thereof has a surface resistivity in the above range, that surface is preferably the surface on which an image is formed.

When the surface resistivity of at least one surface of the substrate is adjusted to a value within the range of about $10^8$ to about $10^{13}$ Ω/cm$^2$, a surfactant, a high molecular electrically conductive agent, or electrically conductive particles can be directly added to a resin at the time of manufacture of the film serving as the substrate. Alternatively, a surfactant can be applied to the film surface, a metal thin film can be deposited on the film, or a suitable amount of a surfactant can be added to an adhesive.

The thickness of the substrate is preferably in a range of about 50 to about 500 µm, and more preferably in a range of about 75 to about 150 µm. When the thickness is less than 50 µm, difficulties may occur in the transport of the resultant film. When the thickness exceeds 300 µm, defects may occur when an image (e.g., toner image) is transferred and in consequence an inferior image may be obtained.

In the invention, the film which transmits light preferably has an image receiving layer on one surface of the substrate and a function control means on the other surface of the substrate.

The function control means preferably controls at least one property selected from gloss, light fastness, an antibacterial property, flame resistance, a releasing property and chargeability. More specifically, the function control means is provided in order to add and/or improve any property of gloss, light fastness, antibacterial property, flame resistance, releasing property, electrical conductivity, humidity resistance, heat resistance, water repellency, wear resistance and scratch resistance. As a result, a film which transmits light and which has a function control means can prove resistant in various working conditions.

As described above, the invention relates to a method and an apparatus for manufacturing a plastic sheet obtained by integrating the layered body containing a film. In particular, the inventors paid attention to a means and a method which prevent the occurrence of defective products at a time of integration, and have devised a plastic sheet manufacturing method and a plastic sheet manufacturing apparatus whereby plastic sheets can be consistently manufactured with a high degree of resolution at a high level of productivity, without producing defective products.

What is claimed is:

1. A plastic sheet manufacturing method whereby a layered body including a film is made to pass through a nip portion formed by a pair of belts each having a joint portion, and thereby the layered body is integrated to manufacture a plastic sheet, the method comprising:
   before integration, detecting, by a detection sensor, the position of each of the joint portions; and
   controlling the timing at which the layered body enters the nip portion in accordance with the detected positions, wherein controlling the timing includes adjusting, in accordance with results outputted by the detection sensor, at least one of a rotating speed of the pair of belts and a transport speed of the layered body.

2. A plastic sheet manufacturing method according to claim 1, wherein controlling the timing further comprises operating a gate disposed at an inlet of the nip portion, in accordance with results outputted by the detection sensor.

3. A plastic sheet manufacturing method according to claim 1, wherein the pair of belts is rotated in such a way that within the nip portion the joint portions of each belt contacts with, or adjoins, each other.

4. A plastic sheet manufacturing method according to claim 1, further comprising: electrophotographically forming an image on at least one surface of the film, and superimposing the film on a core sheet so that the image abuts on the core sheet, to form the layered body.

5. A plastic sheet manufacturing method according to claim 1, further comprising cutting the plastic sheet into a predetermined size, or into a predetermined number of sheets.

6. A plastic sheet manufacturing method, comprising:
   electrophotographically forming an image on at least one surface of a film;
   superimposing the film on a core sheet so that the image abuts on the core sheet, to form a layered body;
   detecting a position of a joint portion on each of a pair of belts, wherein the pair of belts is used to integrate the layered body;
   controlling a timing at which the layered body enters a nip portion formed by the pair of belts in accordance with the detected positions of the joint portions, wherein controlling a timing includes adjusting, in accordance with the detected positions of the joint portions, at least one of a rotating speed of the pair of belts and a transport speed of the layered body;
   making the layered body to pass through the nip portion at a controlled timing so as to integrate the layered body and manufacture a plastic sheet; and
   cutting the plastic sheet into a predetermined size, or into a predetermined number of sheets.

7. A plastic sheet manufacturing apparatus for making a layered body including a film pass through a nip portion formed by a pair of belts each equipped with a joint portion so as to integrate the layered body and manufacture a plastic sheet, the apparatus comprising:
   a detection sensor for detecting the position of each joint portion;
   a timing controller for controlling a timing at which the layered body enters the nip portion, in accordance with results outputted by the detection sensor; and
   a speed controller, wherein the timing controller instructs, in accordance with results outputted by the detection sensor, the speed controller to adjust independently at least one of a rotating speed of the pair of belts and a transport speed of the layered body so that the timing controller controls the timing at which the layered body enters the nip portion.

8. A plastic sheet manufacturing apparatus according to claim 7, further comprising:
a gate at an inlet of the nip portion;
wherein the timing controller opens or closes the gate in accordance with results outputted by the detection sensor so as to control the timing at which the layered body enters the nip portion.

9. A plastic sheet manufacturing apparatus according to claim 7, wherein the pair of belts is rotated in such a way that within the nip portion the joint portion of each belt contacts with, or adjoins, each other.

10. A plastic sheet manufacturing apparatus according to claim 7, further comprising a cutter for cutting the plastic sheet into a predetermined size, or into a predetermined number of sheets.

11. A plastic sheet manufacturing apparatus, comprising:
an image forming section for electrophotographically forming an image on at least one surface of a film;
a superimposing section for superimposing the film on a core sheet so that the image abuts on the core sheet, to form a layered body; and
an integrating section for making the layered body pass through a nip portion formed by a pair of belts, each having a joint portion, so as to integrate the layered body and manufacture a plastic sheet, wherein
the integrating section includes a detection sensor for detecting the positions of the joint portions and a timing controller for instructing, in accordance with results outputted by the detection sensor, a speed controller to adjust independently at least one of a rotating speed of the pair of belts and a transport speed of the layered body so that the timing controller controls the timing at which the layered body enters the nip portion.

12. A plastic sheet manufacturing apparatus according to claim 11, further comprising a cutter for cutting the plastic sheet into a predetermined size, or into a predetermined number of sheets.

* * * * *